(12) United States Patent
Muehlenbrock

(10) Patent No.: US 12,122,281 B2
(45) Date of Patent: Oct. 22, 2024

(54) CALF SUPPORT ARRANGEMENT, AND SEAT

(71) Applicant: Adient US LLC, Plymouth, MI (US)

(72) Inventor: Ludger Muehlenbrock, Recklinghausen (DE)

(73) Assignee: Adient US LLC, Plymouth, MI (US)

( * ) Notice: Subject to any disclaimer, the term of this patent is extended or adjusted under 35 U.S.C. 154(b) by 88 days.

(21) Appl. No.: 18/045,185

(22) Filed: Oct. 10, 2022

(65) Prior Publication Data

US 2023/0112500 A1 Apr. 13, 2023

(30) Foreign Application Priority Data

Oct. 11, 2021 (DE) ...................... 10 2021 211 434.2

(51) Int. Cl.
*B60N 2/90* (2018.01)
(52) U.S. Cl.
CPC ................................... *B60N 2/995* (2018.02)
(58) Field of Classification Search
CPC ...................................................... B60N 2/995
See application file for complete search history.

(56) References Cited

U.S. PATENT DOCUMENTS

| | | | | |
|---|---|---|---|---|
| 5,352,020 | A * | 10/1994 | Wade | B60N 2/995 297/423.26 |
| 6,685,271 | B1 | 2/2004 | Chang | |
| 2008/0312567 | A1 | 12/2008 | Chen | |
| 2011/0240797 | A1 | 10/2011 | Behe | |
| 2016/0000227 | A1 * | 1/2016 | Kim | B60N 2/995 297/423.26 |
| 2017/0202354 | A1 | 7/2017 | Mitschke et al. | |
| 2019/0322202 | A1 | 10/2019 | Hur et al. | |

FOREIGN PATENT DOCUMENTS

| | | |
|---|---|---|
| CN | 101580034 A | 11/2009 |
| CN | 201769707 U | 3/2011 |
| DE | 20219542 U1 | 3/2003 |
| DE | 10209234 A1 | 9/2003 |
| DE | 102004008267 A1 | 9/2005 |

(Continued)

OTHER PUBLICATIONS

German Patent and Trademark Office, Office Action in Appliction No. DE 10 2021 211 434.2, dated Jul. 19, 2022, 8 pages, Munich, Germany.

*Primary Examiner* — Anthony D Barfield
(74) *Attorney, Agent, or Firm* — Marshall & Melhorn, LLC

(57) ABSTRACT

A calf support arrangement for a vehicle seat may have one seat attachment unit. The arrangement may also have one first calf support element which is coupled to the seat attachment unit and is pivotable relative thereto. The arrangement may also have one second calf support element which is coupled to the first calf support element and is movable relative thereto. At least one guide arrangement is provided by which the calf support elements are arranged on the seat attachment unit coupled in terms of movement in such a manner that the two calf support elements are pivotable relative to the seat attachment unit and the second calf support element is movable relative to the first calf support element. A vehicle seat having the calf support arrangement is also provided.

9 Claims, 6 Drawing Sheets

(56) References Cited

FOREIGN PATENT DOCUMENTS

| | | |
|---|---|---|
| DE | 202005000574 U1 | 5/2006 |
| DE | 102013102699 A1 | 11/2013 |
| DE | 102013219659 A1 | 4/2015 |
| DE | 102014117610 A1 | 1/2016 |
| DE | 102019123681 A1 | 3/2021 |
| KR | 1020120136562 A | 12/2012 |
| KR | 101426544 B1 | 8/2014 |

* cited by examiner

CALF SUPPORT ARRANGEMENT, AND SEAT

FIELD

The invention relates to a calf support arrangement for a seat, in particular vehicle seat. Furthermore, the invention relates to a seat, in particular vehicle seat, comprising such a calf support arrangement.

BACKGROUND

Calf support arrangements for seats are known from the prior art, in which a calf support is arranged on a front side of a seat surface of the seat and is pivotable relative to the seat surface. The calf support arrangements are adjustable relative to the seat surface, for example by motor or manually.

SUMMARY

It is the object of the present invention to specify a calf support arrangement which is improved in relation to the prior art and an improved seat, in particular vehicle seat.

With regard to the calf support arrangement, and with regard to the seat, the object is achieved according to the invention by the features of the claims.

The calf support arrangement comprises at least one seat attachment unit, one first calf support element which is coupled to the seat attachment unit and is pivotable relative thereto, and one second calf support element which is coupled to the first calf support element and is movable relative thereto, wherein at least one guide arrangement is provided by which the calf support elements are arranged on the seat attachment unit coupled in terms of movement in such a manner that the two calf support elements are pivotable relative to the seat attachment unit and the second calf support element is movable relative to the first calf support element.

The advantages obtained with the invention consist in particular in that a compact, in particular space-saving, and simply adjustable calf support arrangement with an extendable calf support surface for legs of a person sitting on the seat can be formed. In addition, the calf support arrangement can be designed or is designed to be reduced in terms of numbers of parts and in terms of weight and also in terms of costs.

The design of the calf support arrangement permits an adjustment which can be carried out simply, in particular pivoting with simultaneous or delayed extension, of the calf support elements and therefore of the calf support surface. For example, it is thereby enabled to carry out a pivoting and in addition an extension of the calf support surface of the calf support elements with just one drive unit. Accordingly, the calf support arrangement permits a combined adjustment possibility of pivoting and extension of the calf support surface. The guide arrangement is configured in such a manner that the calf support elements are coupled in terms of movement to one another and are coupled in terms of guidance to the seat attachment unit. The guide arrangement is, for example, a guide mechanism.

The calf support arrangement permits an increase in the sitting comfort in a desired calf support setting and calf support position for people of different height, for example.

The seat attachment unit of the calf support arrangement enables seats which are already in use, in particular vehicle seats, to be retrofitted. The seat attachment unit permits a continuous and/or gap-free support of the thighs and lower legs of the person sitting on the seat.

The calf support arrangement is adjustable or settable at least between two positions, for example. For example, one of the positions corresponds to a non-use position, for example a stowage position, when the seat is in a travel position and sitting position. A second position corresponds to a use position, for example a comfort position.

In one development, the calf support arrangement can be combined with a seat surface which is adjustable in seat depth and/or is adjustable in inclination. In the case of an electrically adjustable seat surface, the calf support arrangement can be automatically adjusted at the same time. For example, the seat surface comprises a fixed seat shell, for example in the form of a holding frame, and a carrying profile mounted movably on the seat shell. Adjustment of the seat depth and/or adjustment of the inclination take place, for example, by retracting and extending and/or pivoting the carrying profile relative to the seat shell. The carrying profile is coupled in terms of movement, for example, to the guide arrangement of the calf support arrangement in such a manner that, when the carrying profile is adjusted, the two calf support elements are movable at the same time. By moving the carrying profile, the two calf support elements are pivotable relative to the seat attachment unit, and the second calf support element is movable relative to the first calf support element.

In a further embodiment, pivoting of the first calf support element results in pivoting of the second calf support element and, for example simultaneously or with a delay, a movement of the second calf support element relative to the first calf support element.

In an alternative embodiment, pivoting of the second calf support element results in a movement of the second calf support element relative to the first calf support element and, for example simultaneously or with a delay, pivoting of the first calf support element.

For example, the guide arrangement is configured in such a manner that the second calf support element carries out a translational movement and moves along with the first calf support element by being coupled in terms of movement thereto. By the first calf support element and the second calf support element being coupled in terms of movement, the second calf support element is movable along with a movement of the first calf support element, or the first calf support element is movable along with a movement of the second calf support element.

In a further embodiment, the guide arrangement comprises at least one pivoting mechanism. The pivoting mechanism is fastened to the seat attachment unit. For example, the pivoting mechanism is provided on a lateral side of the seat attachment unit. In particular, the guide arrangement, in particular the pivoting mechanism, comprises at least one bearing which is arranged on a lateral side of the seat attachment unit.

In a further embodiment, the pivoting mechanism comprises two bearings for increasing guiding stability and pivoting stability. The bearings are fastened, for example, in each case to a lateral side of the seat attachment unit. The calf support elements are arranged between the bearings in the direction of transverse extent of the leg support arrangement.

In a further embodiment, the pivoting mechanism is designed as a slotted guide. The pivoting mechanism, in particular the slotted guide, is configured to predetermine a movement path, in particular pivoting path, for the calf support elements. For example, the bearing of the pivoting mechanism has a guide slot in which a guide pin is guided.

By the two calf support elements being coupled in terms of movement, they are movable in dependence on each other. Depending on a movement of one of the calf support elements, the respective other calf support element is movable at the same time. The bearing has, for example, a curved guide slot. The guide slot may run substantially rectilinearly. The guide slot has a first end which is arranged in the connecting region of the bearing and the seat attachment unit. The guide slot has a second end which is arranged offset horizontally and vertically with respect to the first end. As a result, a movement path, in particular pivoting path, for the calf support elements can be predetermined. At least one of the calf support elements is arranged on the guide slot and is movable along the guide slot. The bearing is, for example, a bearing plate. The guide slot is designed in the form of an elongated hole.

In a further embodiment, the guide arrangement in particular the pivoting mechanism, comprises a guide pin which is guided in the guide slot, wherein the guide pin is fastened to the second calf support element.

During a movement of the second calf support element and/or the guide pin, pivoting of the second calf support element can be initiated.

For example, the second calf support element is movable along the guide slot along with a movement of the first calf support element in such a manner that the second calf support element is pivoted and moved.

In a further embodiment, the guide arrangement comprises at least one adjustment mechanism for moving the second calf support element relative to the first calf support element. The adjustment mechanism is designed as a rail arrangement. The rail arrangement comprises at least one first rail element, which is arranged on the first calf support element, and at least one second rail element, which is arranged on the second calf support element. For example, the second rail element is held in a manner guided in the first rail element, or vice versa.

The first calf support element is mounted rotatably, for example, on the seat attachment unit. The second calf support element is mounted rotatably and held in a guided manner, for example, on the bearing of the pivoting mechanism. The rail elements form, for example, a rail arrangement which permits a movement of the second calf support element relative to the first calf support element. The rail element of the first calf support element is designed, for example, in the form of an open rail. The rail element of the second calf support element is, for example, a rail element which is arranged displaceably in the open rail. For example, the second rail element is a rail block or a pin.

In a further embodiment, in a non-use position, the calf support elements are arranged at least partially overlapping or parallel one above the other. The non-use position is a stowage position of the calf support elements. In the non-use position, the calf support elements are arranged substantially perpendicularly to the seat surface and below the latter.

In a further embodiment, in a use position, the second calf support element is arranged offset with respect to the first calf support element in the movement direction of the second calf support element. The calf support elements here can take up a plurality of use positions in which the two calf support elements are positioned in different pivoting positions relative to the seat attachment unit, and the second calf support element is positioned in different longitudinal positions relative to the first calf support element.

In the non-use position, an overall length of the calf support elements is shorter than an overall length of the calf support elements in one of the use positions. The second calf support element moves depending on a pivoting movement of at least one of the calf support elements.

In a further embodiment, the second calf support element has an additional support plate which is fixed to the second calf support element and is movable along with a movement of the second calf support element relative to the first calf support element. The first calf support element is arranged at least in sections between the support plate and the second calf support element. In the non-use position, the support plate forms a calf support surface which is directed outward, i.e. in the direction of calves of a person sitting on the seat. The support plate is fixed to the second calf support element via a holding device, for example. The support plate is movable, in particular shiftable, along with a movement of the second calf support element relative to the first calf support element. In the non-use position, the calf support elements and the support plate are arranged at least partially overlapping or one above another in parallel so as to save space. In one of the use positions, for example an intermediate position and an end use position, the second calf support element together with the support plate is arranged offset with respect to the first calf support element in the movement direction of the second calf support element.

Furthermore, the invention relates to a seat, in particular vehicle seat, which comprises at least one seat shell and one calf support arrangement, wherein the calf support arrangement is connected to the seat shell in a front region thereof. The calf support arrangement comprises at least one seat attachment unit, one first calf support element which is coupled to the seat attachment unit and is pivotable relative thereto, and one second calf support element which is coupled to the first calf support element and is movable relative thereto, wherein at least one guide arrangement is provided by which the calf support elements are arranged on the seat attachment unit coupled in terms of movement in such a manner that the two calf support elements are pivotable relative to the seat attachment unit and the second calf support element is movable relative to the first calf support element.

DESCRIPTION OF DRAWINGS

Exemplary embodiments of the invention will be explained in more detail with reference to drawings, in which.

DETAILED DESCRIPTION

Mutually corresponding parts are provided with the same reference signs in all of the figures.

FIGS. 1A to 1D show, schematically, in side views, a seat 1, in particular vehicle seat, with a calf support arrangement 2 in different positions S1 to S4.

Figure 1A:
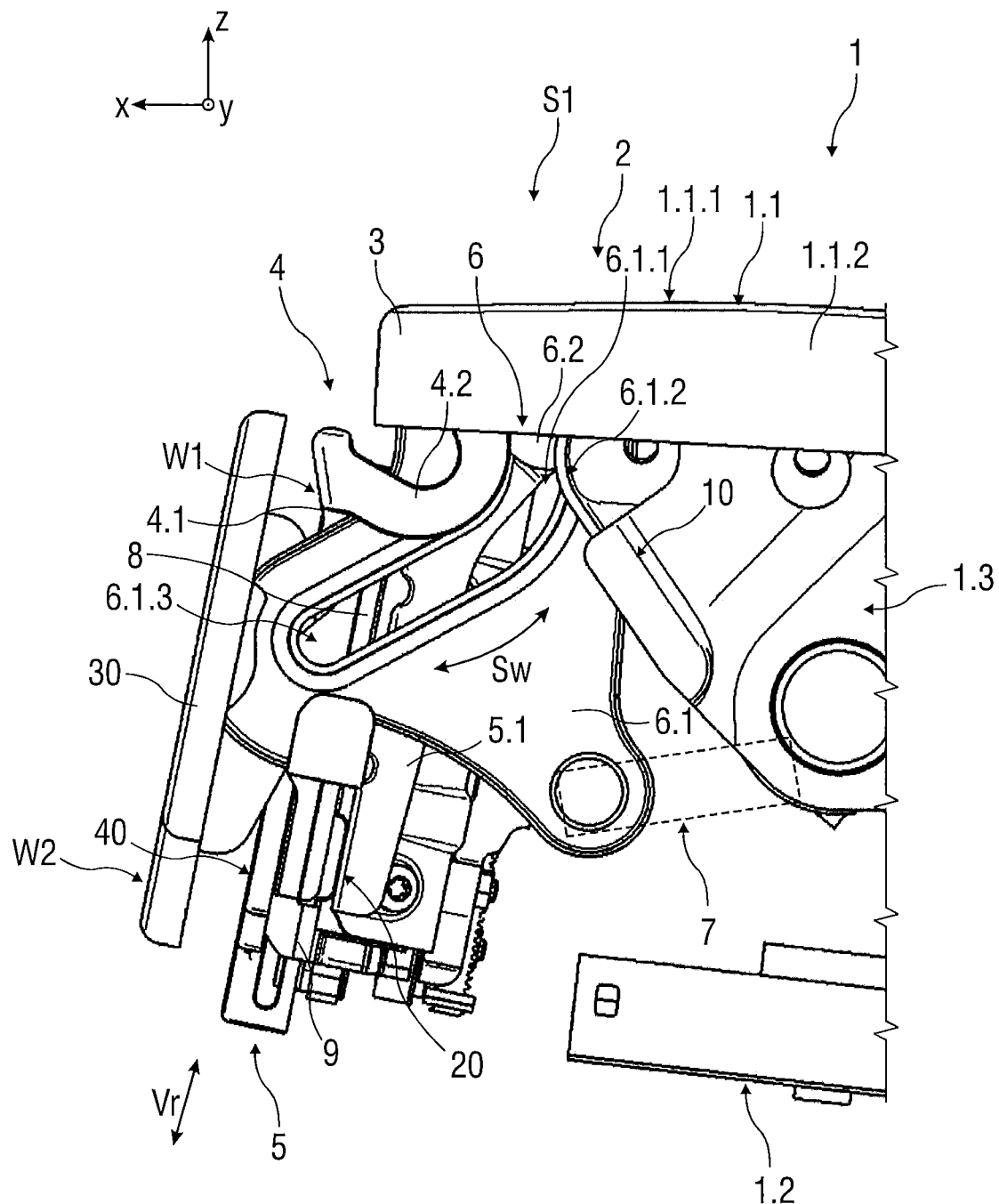
FIG. 1A shows schematically, in a side view, a seat, in particular vehicle seat, with a calf support arrangement.
Figure 1B:
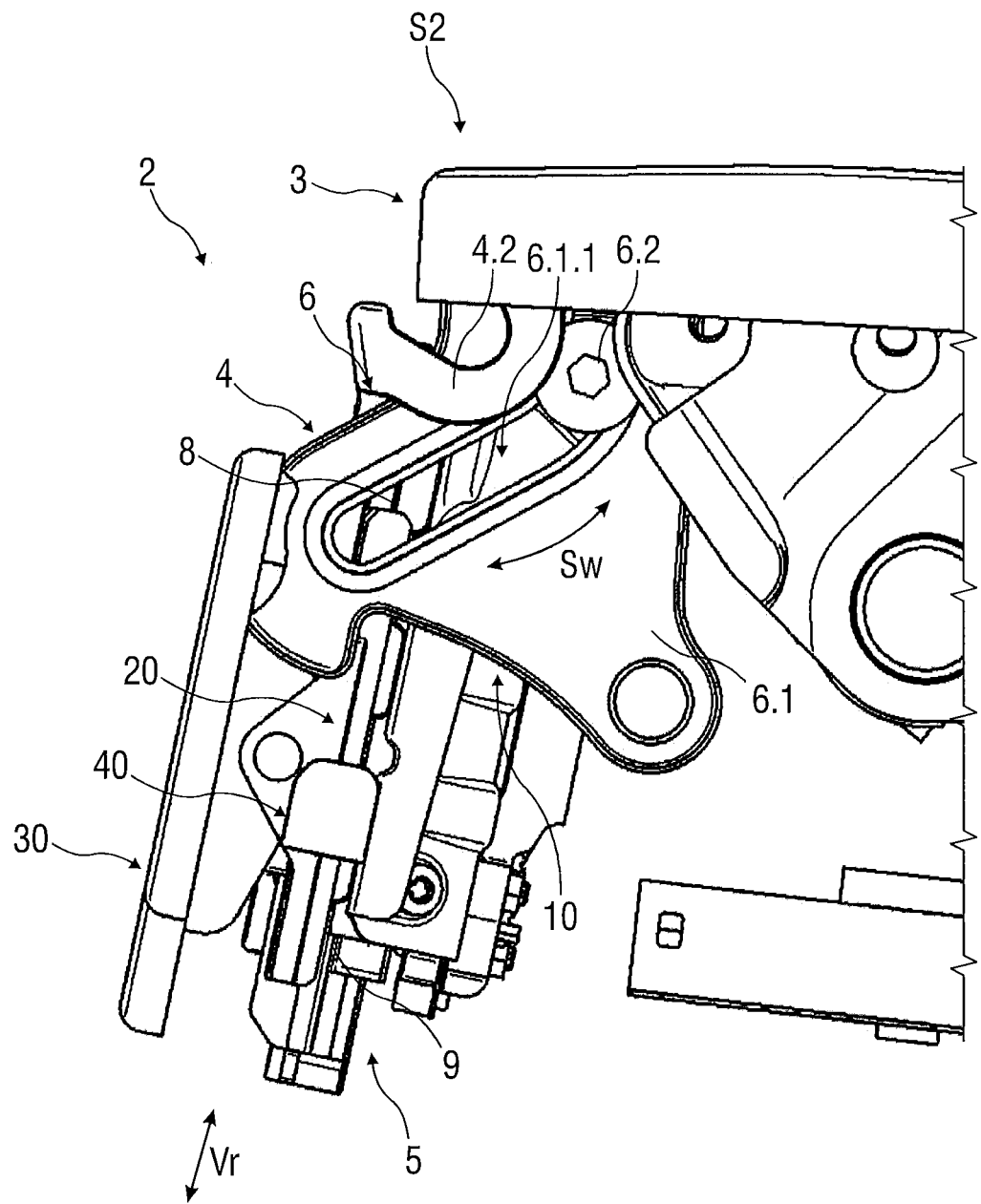
FIG. 1B shows schematically, in a side view, a seat, in particular vehicle seat, with a calf support arrangement in a different position.
Figure 1C:
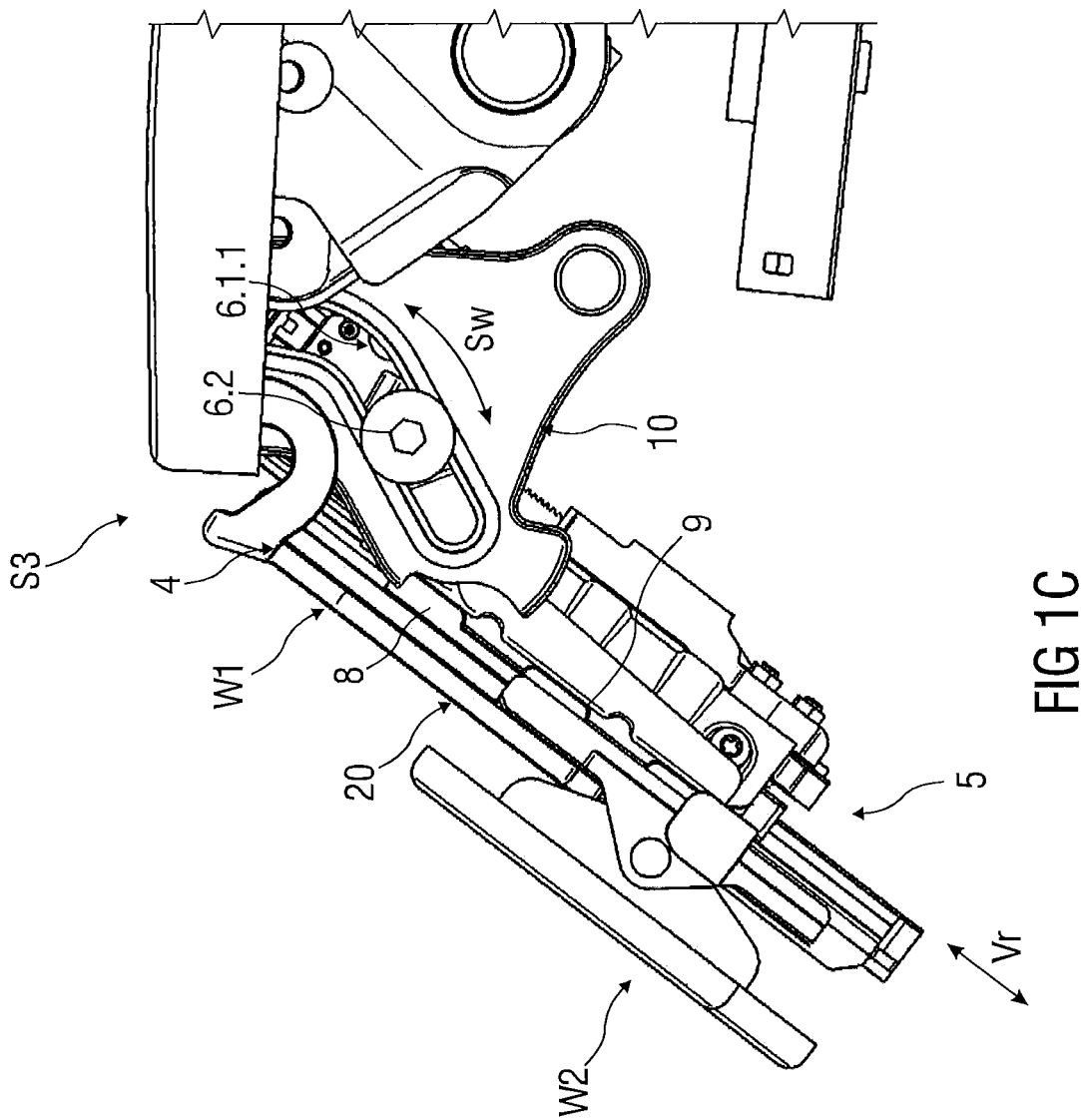
FIG. 1C shows schematically, in a side view, a seat, in particular vehicle seat, with a calf support arrangement in a different position.
Figure 1D:
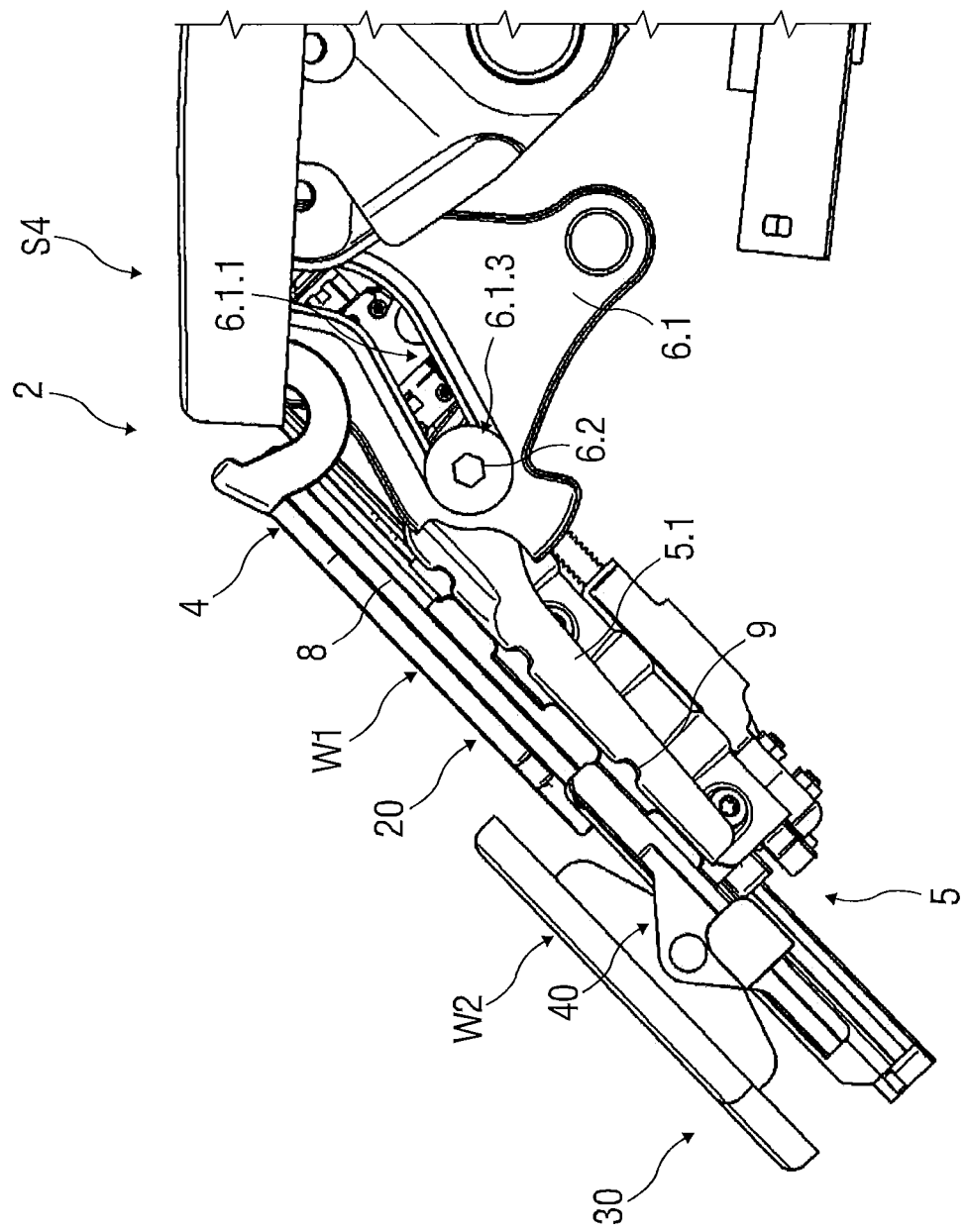
FIG. 1D shows schematically, in a side view, a seat, in particular vehicle seat, with a calf support arrangement in a different position.

FIGS. 1A to 1D likewise show a sequence of movement of the calf support arrangement 2 from a first position S1, also called non-use position S1 hereinafter, via further positions S2, S3 into a final position S4. The further positions S2, S3 are, for example, intermediate positions and the final position S4 is an end use position, wherein the positions S2 to S4 are referred to hereinafter by use positions S2 to S4. In particular, FIG. 1A shows the calf support arrangement 2 in the non-use position S1, FIGS. 1B and 1C show the calf support arrangement 2 in use positions S2, S3, in particular intermediate positions, and FIG. 1D shows the calf support arrangement 2 in the use position S4, in particular in a final use position S4.

For better understanding, a system of coordinates is depicted, wherein the longitudinal axis x corresponds to a direction of longitudinal extent, the transverse axis y to a direction of transverse extent, and the vertical axis z to a direction of vertical extent of the seat 1 which is arranged in a vehicle, for example.

The seat 1 comprises, for example, a seat shell 1.1 and a backrest, not illustrated specifically. The backrest is arranged, for example, on a rear side of the seat shell 1.1 and is connected to the seat shell 1.1 via a fitting system.

The seat 1 is fastened, for example, to a rail device 1.2 for adjusting the seat 1 relative to a vehicle floor. The seat 1 comprises, for example, a basic structure 1.3 which connects the seat shell 1.1 to the rail device 1.2. The basic structure 1.3 is, for example, a seat carrier structure. The seat shell 1.1 is designed, for example, in the form of a seat frame part and can have suspension elements in the region of a seat surface.

The calf support arrangement 2 is arranged on the seat shell 1.1. In particular, the calf support arrangement 2 is connected to a front side 1.1.1 of the seat shell 1.1. The seat shell 1.1 comprises, for example, a rear side, a front side 1.1.1 and two lateral sides 1.1.2 which connect the rear side to the front side 1.1.1.

The calf support arrangement 2 comprises a seat attachment unit 3. The seat attachment unit 3 is, for example, a carrier structure and/or fastening structure for attaching the calf support arrangement 2 to the seat 1, in particular to the seat shell 1.1. In one development, the seat attachment unit 3 may also be part of the seat shell 1.1. For example, seat shell 1.1 and seat attachment unit 3 are formed integrally. The seat attachment unit 3 forms, for example, the front side 1.1.1 of the seat shell 1.1. The calf support arrangement 2 is held movably on the seat shell 1.1 via the seat attachment unit 3.

The calf support arrangement 2 comprises a first calf support element 4 which is coupled to the seat attachment unit 3 and is pivotable relative thereto. The first calf support element 4 is, for example, a calf support plate or a calf support frame. The calf support arrangement 2 comprises a second calf support element 5 which is coupled to the first calf support element 4 and is movable relative thereto. The second calf support element 5 is, for example, a calf support plate or a calf support frame. The two calf support elements 4, 5 can be provided with upholstery, not illustrated specifically. The calf support elements 4, 5 have calf support surfaces W1, W2 for comfortably supporting the calves or lower legs of a person sitting on the seat 1.

Furthermore, the calf support arrangement 2 comprises a guide arrangement 6 for movably guiding and holding the calf support elements 4, 5 relative to the seat attachment unit 3.

The guide arrangement 6 is fastened to the seat attachment unit 3. Optionally in addition, the guide arrangement 6 is fastened to the basic structure 1.3 of the seat 1. For example, the guide arrangement 6 can be connected, in particular fastened, to and/or on the basic structure 1.3 of the seat 1 via a fastening structure 7. For example, the guide arrangement 6 is connected to the seat attachment unit 3 in an integrally bonded, force-fitting and/or form-fitting manner.

In particular, the guide arrangement 6 comprises a pivoting mechanism 10 and an adjustment mechanism 20, for example a displacement mechanism.

The pivoting mechanism 10 comprises at least one bearing 6.1 which is fastened to the seat attachment unit 3. Optionally in addition, the bearing 6.1 is fastened to the basic structure 1.3 by the fastening structure 7. The bearing 6.1 is, for example, a carrier plate. The bearing 6.1 has a guide slot 6.1.1 in and/or on which the second calf support element 5 is movably held, in particular held in a guided manner. The guide slot 6.1.1 predetermines a pivoting path Sw for the second calf support element 5 and therefore also for the first calf support element 4 which is coupled in terms of movement to the second calf support element 5.

By the coupling of the two calf support elements 4, 5 in terms of movement, they are movable depending on each other. The coupling in terms of movement is undertaken by the pivoting mechanism 10 and the adjustment mechanism 20. The first calf support element 4 is mounted rotatably on the seat attachment unit 3. The second calf support element 5 is mounted rotatably and held in a guided manner on the bearing 6.1 of the pivoting mechanism 10. The second calf support element 5 is coupled in terms of movement movably to the first calf support element 4 via the adjustment mechanism 20.

The guide slot 6.1.1 is designed in the form of an elongated hole which is formed in the bearing 6.1. The guide slot 6.1 has a profile directed in a direction away from the seat attachment unit 3. The guide slot 6.1 has a curved shape. A first end 6.1.2 of the guide slot 6.1 is arranged in the connecting region of the bearing 6.1 and of the seat attachment unit 3. A second end 6.1.3 of the guide slot 6.1 is arranged offset horizontally and vertically with respect to the first end 6.1.2. The ends 6.1.2, 6.1.3 of the guide slot 6.1 predetermine end positions of the calf support elements 4, 5. For example, the ends 6.1.2, 6.1.3 are designed in the form of end stops.

The bearing 6.1 has essentially a triangular basic shape. The bearing 6.1 may alternatively also have a different basic shape. In order to increase guiding stability and carrying stability of the two calf support elements 4, 5 on the seat attachment unit 3, the guide arrangement 6 comprises two bearings 6.1 which are spaced apart from each other and are arranged in parallel. However, just one bearing 6.1 can be seen in the illustrated figures. A bearing 6.1 can be arranged on each lateral side 1.1.2 of the seat 1 or on each lateral side of the seat attachment unit 3. The calf support elements 4, 5 are arranged, for example, between the bearings 6.1.

The guide arrangement 6, in particular the pivoting mechanism 10, comprises a guide pin 6.2 which is fastened to the second calf support element 5. The guide pin 6.2 is held in a guided manner in the guide slot 6.1.1 of the bearing 6.1. In FIG. 1A, the guide pin 6.2 is concealed by a structure of the seat attachment unit 3. The guide pin 6.2 is arranged on a lateral side 5.1 of the second calf support element 5. The guide pin 6.2 protrudes outward from the lateral side 5.1, i.e. in the transverse direction or in the direction of the bearing 6.1. In the illustrated exemplary embodiment, guide pins 6.2 are provided on both lateral sides 5.1 of the second calf support element 5 and each engage in the corresponding guide slot 6.1.1. The second calf support element 5 is held movably on the seat attachment unit 3 via the bearing 6.1. When the second calf support element 5 and/or the guide pin 6.2 is moved, a pivoting of the second calf support element 5 relative to the seat attachment unit 3 can be initiated. By coupling the two calf support elements 4, 5 in terms of movement by the adjustment mechanism 20, the first calf support element 4 is movable along with a movement of the second calf support element 5 and/or the second calf support element 5 is movable along with a movement of the first calf support element 4.

For example, a drive unit, not illustrated specifically, is provided which is coupled to the first calf support element 4 and triggers or initiates a movement, in particular pivoting, of the first calf support element 4. The pivoting of the first calf support element 4 brings about a pivoting of the second calf support element 5 and a movement of the second calf support element 5 relative to the first calf support element 4. The pivoting of the first calf support 4 forces a retraction or extension movement of the second calf support element 5, with the guide slot 6.1.1 simultaneously permitting the pivoting of the second calf support element 5 relative to the seat attachment unit 3. For example, the second calf support element 5 is movable along the guide slot 6.1.1 along with a movement, in particular pivoting, of the first calf support element 4 in such a manner that the second calf support element 5 is pivotable and movable.

The drive unit is, for example, alternatively coupled to the second calf support element 5 and/or to the guide pin 6.2, which is fastened to the second calf support element 5, and therefore the drive unit can trigger or initiate a movement, in particular pivoting, of the second calf support element 5.

By movement of the second calf support element 5 along the pivoting path Sw, a pivoting of the first calf support element 4 about a pivot point formed on the seat attachment unit 3 is initiated. At the same time or with a delay, the second calf support element 5 moves in a movement direction Vr relative to the first calf support element 4. The movement is undertaken by displacement of the guide pin 6.2 along the guide slot 6.1.1. In other words: when the guide pin 6.2 moves along the guide slot 6.1.1, the first calf support element 4 is pivotable together with the second calf support element 5 and the second calf support element 5 is movable in the movement direction Vr relative to the first calf support element 4. The movement of the guide pin 6.2 along the guide slot 6.1.1 pushes or pulls the second calf support element 5 in the movement direction Vr relative to the first calf support element 4.

In the non-use position S1, as illustrated in FIG. 1A, the guide pin 6.2 is arranged at the first end 6.1.2 of the guide slot 6.1. This position of the guide pin 6.2 cannot be seen in FIG. 1A. The guide pin 6.2 is arranged, for example, below and/or in an interior of the seat attachment unit 3. In the final possible use position S4, as shown in FIG. 1D, the guide pin 6.2 is arranged at the second end 6.1.3 of the guide slot 6.1. A sequence of movement of the calf support elements 4, 5, as shown in FIGS. 1B and 1C, takes place by movement of the guide pin 6.2 along the guide slot 6.1.1.

In the non-use position S1, the calf support elements 4, 5 are arranged at least partially overlapping or one above another in parallel. In the use positions S2 to S4, the calf support elements 4, 5 are pivoted relative to the seat attachment unit 3 and the second calf support element 5 is displaced relative to the first calf support element 4.

In the use positions S2 to S4, the second calf support element 5 is arranged offset in the movement direction Vr with respect to the first calf support element 4.

The calf support elements 4, 5 are coupled in terms of movement to the seat attachment unit 3 by the guide arrangement 6 in such a manner that the two calf support elements 4, 5 are pivotable relative to the seat attachment unit 3 and the second calf support element 5 is movable relative to the first calf support element 4. A combined adjustment of the calf support arrangement 2 is thereby made possible.

The combined adjustment comprises pivoting and extension of the calf support arrangement 2. The second calf support element 5 is retractable and extendable relative to the first calf support element 4. The two calf support elements 4, 5 are formed pivotably relative to the seat attachment unit 3. A movement of one of the calf support elements 4, 5 can be triggered, for example, by a drive unit, not illustrated specifically. In other words: one drive unit is sufficient both to pivot and to extend or to shorten the calf support arrangement 2. This saves on weight, construction space and costs.

The adjustment mechanism 20 is configured for moving the second calf support element 5 relative to the first calf support element 4. The adjustment mechanism 20 is designed as a rail arrangement. The adjustment mechanism 20 comprises a first rail element 8 which is arranged on the first calf support element 4. The adjustment mechanism 20 comprises a second rail element 9 which is arranged on the second calf support element 5. The rail elements 8, 9 form, for example, a pair of rails. The adjustment mechanism 20 has, for example, two pairs of rails, with only one pair of rails being visible in the illustrated embodiments. The adjustment mechanism 20 comprises, for example, two pairs of rails which are each arranged on one lateral side 4.1, 5.1 of the calf support elements 4, 5. For example, the second rail element 9 is held displaceably in the first rail element 8, or vice versa.

Furthermore, the second calf support element 5 comprises an additional support plate 30. The support plate 30 is fastened to the second calf support element 5 via a holding device 40. The support plate 30 forms the calf support surface W2 of the second calf support element 5 in the non-use position S1. In the use positions S2 to S4, the support plate 30 can form a calf and foot support surface for the person sitting on the seat 1. In the non-use position S1, the calf support elements 4, 5 and the support plate 30 are arranged one above the other so as to save space. For example, the calf support elements 4, 5 and the support plate 30 are arranged partially overlapping. In one of the use positions S2 to S4, the second calf support element 5 is arranged together with the support plate 30 offset in the movement direction Vr with respect to the first calf support element 4.

The calf support elements 4, 5 and the support plate 30 thus form what is referred to as a sandwich arrangement. The first calf support element 4 is arranged between the support plate 30 and the second calf support element 5. The holding device 40 is configured to keep the support plate 30 spaced apart from the second calf support element 5. The second calf support element 5 is, for example, a carrying structure for the support plate 30. The support plate 30 is movable, in particular shiftable, along with a movement of the second calf support element 5 relative to the first calf support element 4. The support plate 30 is pivotable along with pivoting of the calf support elements 4, 5.

In one development, the first calf support element 4 comprises a connecting structure 4.2 which is mounted rotatably on the seat attachment unit 3. The connecting structure 4.2 is designed, for example, in the form of a curved connecting arm. The curved form of the connecting structure 4.2 permits a continuous and/or gap-free arrangement of the first calf support element 4 on the seat shell 1.1 in one of the use positions S2 to S4. The connecting structure 4.2 is arranged, for example, in front of the bearing 6.1 in the transverse direction.

Figure 2A:
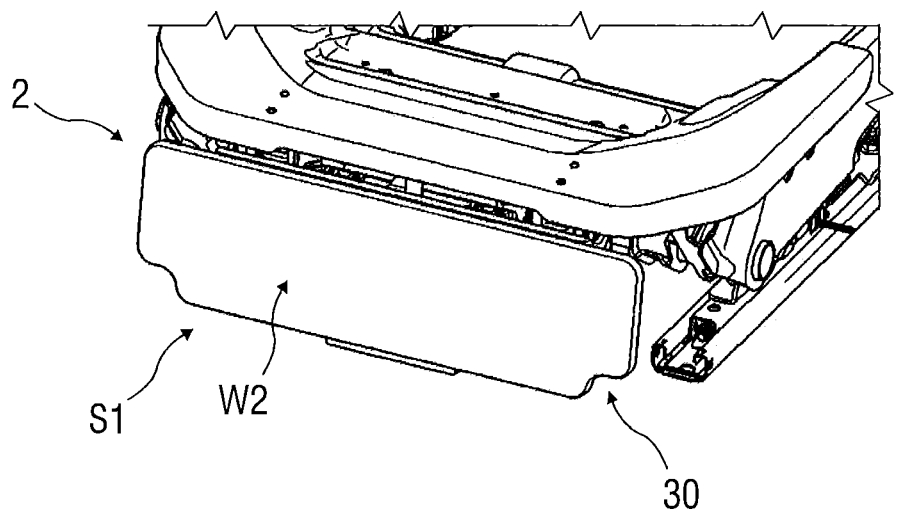
FIG. 2A shows schematically, in a perspective view, the seat, in particular vehicle seat, with the calf support arrangement.
Figure 2B:
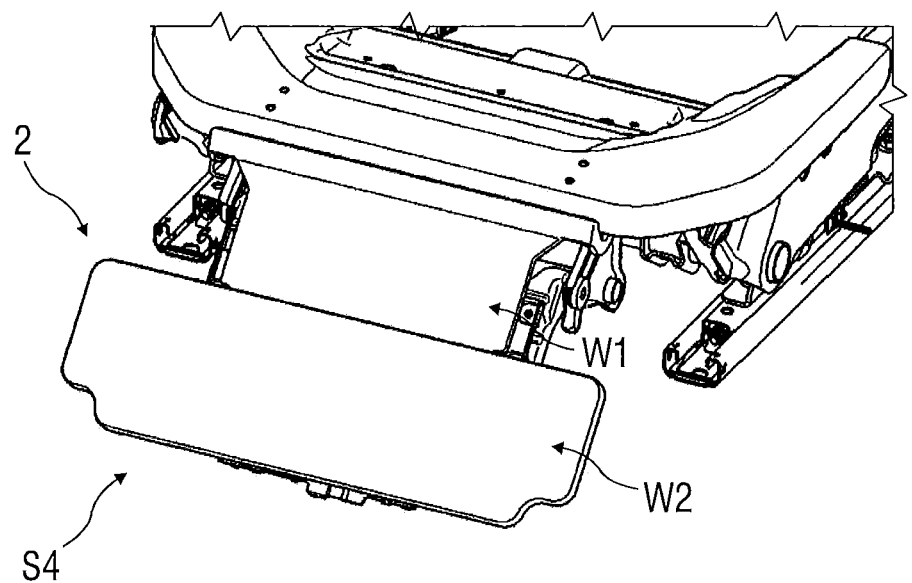
FIG. 2B shows schematically, in a perspective view, the seat, in particular vehicle seat, with the calf support arrangement in a different position.

FIGS. 2A and 2B show, schematically, in perspective views, the seat 1, in particular vehicle seat, with the calf support arrangement 2 in different positions.

Figure 3A:
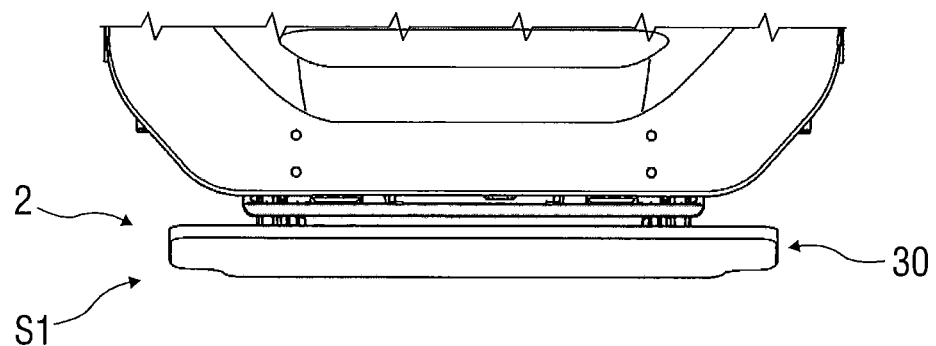
FIG. 3A shows schematically, in a top view, the seat, in particular vehicle seat, with the calf support arrangement.
Figure 3B:
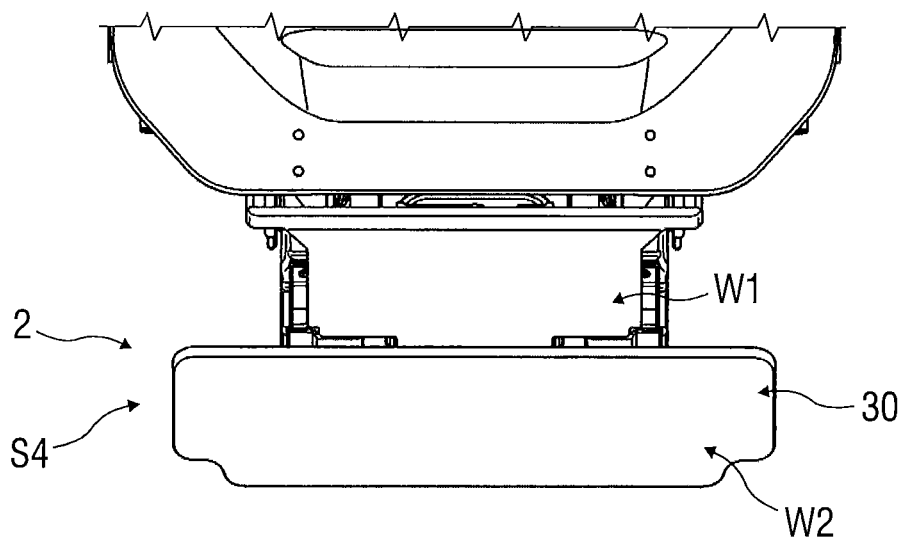
FIG. 3B shows schematically, in a top view, the seat, in particular vehicle seat, with the calf support arrangement in a different position.

FIGS. 3A and 3B show, schematically, in top views, the seat 1, in particular vehicle seat, with the calf support arrangement 2 in different positions.

LIST OF REFERENCE SIGNS

1 Seat
1.1 Seat shell
1.1.1 Front side
1.2 Rail device
1.3 Basic structure
2 Calf support arrangement
3 Seat attachment unit
4 Calf support element
4.1 Lateral side
4.2 Connecting structure
5 Calf support element
5.1 Lateral side
6 Guide arrangement
6.1 Bearing
6.1.1 Guide slot
6.1.2, 6.1.3 End
6.2 Guide pin
7 Fastening structure
8, 9 Rail element
10 Pivoting mechanism
20 Adjustment mechanism
30 Support plate
40 Holding device
S1 Position, in particular non-use position
S2 to S4 Positions, in particular use positions
Sw Pivoting path
Vr Movement direction
W1, W2 Calf support surface
x Longitudinal axis
y Transverse axis
z Vertical axis

The invention claimed is:

1. A calf support arrangement for a vehicle seat, comprising:
   one seat attachment unit,
   one first calf support element which is coupled to the seat attachment unit and is pivotable relative thereto, and
   one second calf support element which is coupled to the first calf support element and is movable relative thereto,
   wherein at least one guide arrangement is provided by which the calf support elements are arranged on the seat attachment unit coupled in terms of movement in such a manner that the two calf support elements are pivotable relative to the seat attachment unit and the second calf support element is movable relative to the first calf support element,
   wherein a bearing is fixed in a stationary manner to the seat attachment unit,
   wherein the bearing has a guide slot extending therethrough,
   wherein a guide pin is fixed in a stationary manner to the second calf support element and extends through the guide slot and is adapted for movement within the guide slot.

2. The calf support arrangement as claimed in claim 1, wherein pivoting of the first calf support element results in pivoting of the second calf support element and a movement of the second calf support element relative to the first calf support element can be initiated.

3. The calf support arrangement as claimed in claim 1, wherein the guide arrangement comprises at least one pivoting mechanism.

4. The calf support arrangement as claimed in claim 3, wherein the pivoting mechanism comprises the slotted guide which predetermines a movement path for the calf support elements.

5. The calf support arrangement as claimed in claim 1, wherein the guide arrangement comprises at least one adjustment mechanism for moving the second calf support element relative to the first calf support element.

6. The calf support arrangement as claimed in claim 5, wherein the adjustment mechanism is designed as a rail arrangement.

7. The calf support arrangement as claimed in claim 1, wherein, in a non-use position, the calf support elements are arranged at least partially overlapping or parallel to each other.

8. The calf support arrangement as claimed in claim 1, wherein the second calf support element has an additional support plate which is fixed to the second calf support element and is movable along with a movement of the second calf support element relative to the first calf support element.

9. A vehicle seat, comprising at least one seat shell and one calf support arrangement as claimed in claim 1, wherein the calf support arrangement is connected to the seat shell in a front region thereof.

* * * * *